Nov. 12, 1963     D. E. NAPIER     3,110,284
GAUGE MOVEMENTS
Filed April 17, 1962

INVENTOR:
DAVID ERNEST NAPIER
BY Kenwood Ross
ATTORNEY.

United States Patent Office 3,110,284
Patented Nov. 12, 1963

3,110,284
GAUGE MOVEMENTS
David Ernest Napier, 463 Chester Road,
Manchester, England
Filed Apr. 17, 1962, Ser. No. 188,083
Claims priority, application Great Britain May 19, 1961
3 Claims. (Cl. 116—129)

This invention relates to gauge and like movements particularly, but not exclusively, to those gauge movements which, on actuation thereof, cause a pointer to move over a dial to give an indication of the magnitude of actuation of the movement.

It is an object of the present invention to provide a novel form of gauge movement which is simple and economical to manufacture and yet which gives a high degree of accuracy.

According to the present invention there is provided a gauge or like movement comprising a first member carrying a spade or like spigot engaging between adjacent ridges of a helical worm of a rotatable second member whereby, in use, relative movement between the first and second members causes rotation of the latter, which rotation indicates, for example, by means of a pointer and a dial, movement of the first member.

Advantageously, the relative movement is in a direction axially of the helix of the helical worm.

In one preferred embodiment, the first member is capable of movement axially of the helix.

The first member is conveniently resiliently loaded against such axial movement.

The second member may also be resiliently loaded against rotational movement.

The fiirst and second members may each comprise rod-like members, the spade or like spigot being accommodated in a transverse bore in the first member and that end thereof remote from the worm engaging end may be located in a guide slot of a mounting of the first and second members, the guide slot extending parallel to the first member, the arrangement being such that rotation of the first member about its axis is prevented.

The helical worm advantageously comprises a helical coil of wire which is "sprung" onto the second member.

Adjustment means may also be provided for setting a zero position of the first member relative to the second member.

The invention will be described further, by way of example, with reference to the accompanying drawings, in which.

Figure 1:
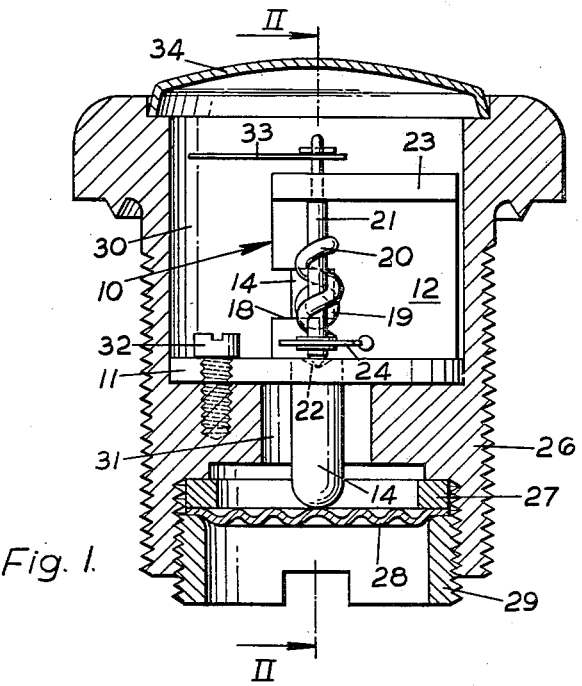
FIG. 1 is an axial section of a casing containing a gauge movement in accordance with the present invention.
Figures 2, 3:
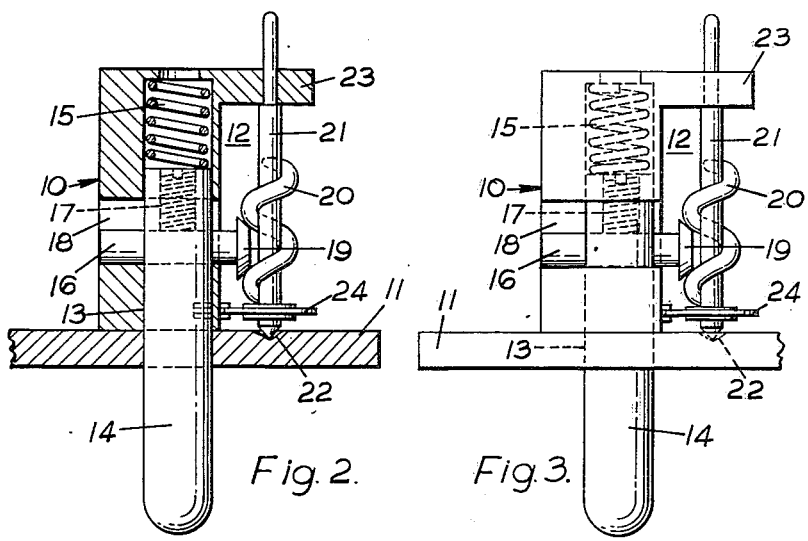
FIG. 2 is a sectional view, on an enlarged scale, along the line II—II of FIG. 1, with certain parts removed for the sake of clarity.
FIG. 3 is an elevation of the gauge movement of FIG. 2.

A gauge or like movement, constructed in accordance with the present invention comprises a mounting 10 having a circular base plate 11. A part of the mounting 10 is recessed to form a compartment 12, as will hereinafter be described.

The mounting 10 has a bore 13 extending axially through the base plate 11 wherein is accommodated a rod-like first member 14. Also accommodated in the axial bore 13 is a coiled compression spring 15 whereagainst one end of the first member 14 abuts, the first member 14 thus being resiliently loaded towards a position wherein one end thereof projects from the circular base plate 11. The first member 14 is retained in the axial bore 13, against the action of the compression spring 15, by a spade or like spigot 16 accommodated in a transverse bore in the first member 14 and secured therein by screw means 17 extending axially of the first member 14. One end of the spade or like spigot 16 is accommodated in a guide recess 18 in the mounting, one end of which recess acts as a stop thus effecting retention of the first member 14. The engagement of the spade or spigot 16 in the guide recess 18 also prevents rotation (in one direction) of the first member 14 about its axis. The other end of the spade or like spigot 16 is provided with a circular boss 19 which engages between adjacent ridges of a helical worm 20 of a second member 21.

The second member 21 is also of rod-like form and extends parallel to the first member 14, being rotatably journalled, at one end, in a suitable bearing 22 and, adjacent the other end, in an end plate 23. The second member 21 extends in the recessed compartment 12 of the mounting 10. The end plate 23 is integral with and upstands from the mounting 10 and defines the compartment 12 between itself and a confronting face of the base plate 11.

A helically coiled wire is "sprung" onto the second member to form the helical worm 20 and the second member 21 is resiliently loaded, by means of a hair spring 24, to ensure that the circular boss 19 is always in contact with one of the ridges of the helix and, thus, to avoid backlash.

It is envisaged that a major use of the movement in accordance with the present invention will be to indicate the condition of pressurized fire extinguishers and, to this end, the movement may be mounted in a suitable housing comprising (as shown in FIG. 1) a cylindrical externally screw threaded casing 26 adapted for location in a correspondingly screw threaded aperture in a fire extinguisher casing (not shown). At one end, the casing 26 is recessed and is screw-threaded internally and accommodates therein a sealing ring 27 and a pressure responsive diaphragm 28, the diaphragm being held in position by a correspondingly screw-threaded locking ring 29.

At the other end, the casing has a second cylindrical recess 30, which communicates with the first mentioned recess of the casing 26 by means of an axial passageway 31.

The movement is mounted in the second cylindrical recess 30, in such a manner that the projecting end of the first member 14 is accommodated in the passageway 31 and bears against the diaphragm 28, and is secured therein by means of a screw 32.

A dial (not shown) is then secured to the end plate 23 and the end face of the mounting 10 and a pointer 33 is secured to the projecting end of the second member 21. That end of the casing 26 adjacent the dial and pointer 33, is appropriately recessed to accommodate a perspex or like transparent dial cover 34.

Adjustment of the movement may be effected by the initial positioning of the helically coiled wire 20 on the second member 21 or by appropriate positioning of the pointer 33 relative to the second member 21. Alternatively, screw means (not shown) may be provided for adjusting the effective end positions of the spade or like spigot 16 in the guide recess 18.

The invention is not confined to the precise details of the foregoing example and variations may be made thereto. For instance, as the invention resides in the principle of a worm engaged by a spade or like spigot as hereinbefore defined, it will be appreciated that only technical variation, and not inventive skill, is necessary to apply the invention to any arrangement wherein an indication is required of movement of a first member relative to a second member. Thus, the description of the mounting and housing are only illustrative of a preferred embodiment.

I claim:
1. A gauge movement comprising, a mounting having a transversely-extending guide slot in a wall thereof, a spade-carrying first member characterized by a capacity for a sliding axial movement and having a bore extending transversely therethrough, a transversely-extending spade receivable in the bore of and carried by said first member, a first spring means resiliently loading said first member against axial movement relative to said mounting, a rotatable rod-like second member, an indicating means mounted on and rotatable with said second member, a helically-coiled member wound around said second member and defining ridges therealong, a second spring means resiliently loading said second member against rotation relative to said mounting, one end of said spade engaging between ones of the ridges defined along said second member on axial movement of said first member for effectuating rotation of said second member and the other end of said spade being guided in the guide slot in said mounting for precluding rotation of said first member, and a flexible pressure responsive diaphragm carried by said housing in position for effectuating axial displacement of said first member and rotative movement of said second member and said indicating means.

2. In the gauge movement as set forth in claim 1, including, said second spring means having a capacity for effectuating movement of said indicating means to its normal rest position during non-operation.

3. In the gauge movement as set forth in claim 1, including screw means for adjusting the positioning of said spade relative to said mounting.

References Cited in the file of this patent
UNITED STATES PATENTS

| | | |
|---|---|---|
| 837,606 | Carrico | Dec. 4, 1906 |
| 2,726,626 | Zelnick | Dec. 13, 1955 |